Figure 1:
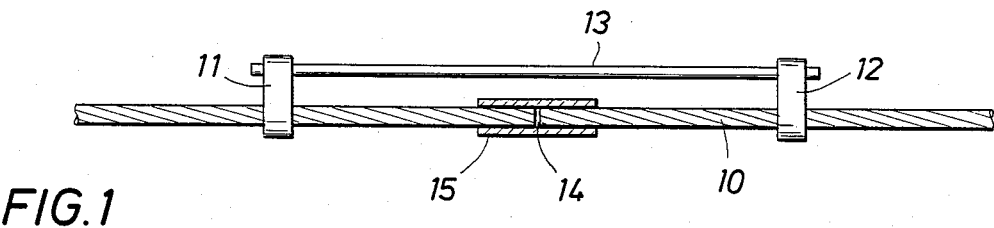

United States Patent [19]

Williams

[11] Patent Number: 4,817,682
[45] Date of Patent: Apr. 4, 1989

[54] SPLICING TOOL FOR TRANSMISSION LINES

[75] Inventor: Danny R. Williams, Friendswood, Tex.

[73] Assignee: Houston Industries, Incorporated, Houston, Tex.

[21] Appl. No.: 682,745

[22] Filed: Dec. 17, 1984

[51] Int. Cl.⁴ .......................................... B21F 15/02
[52] U.S. Cl. ............................... 140/113; 24/135 K; 140/147
[58] Field of Search ................. 140/36, 113, 115, 117, 140/119, 121, 123, 149, 118, 111, 116, 122, 147; 29/282, 519; 24/135 R, 135 K

[56] References Cited

U.S. PATENT DOCUMENTS

| 1,234,038 | 7/1917 | Kelleg | 24/135 K |
| 2,294,091 | 8/1942 | Mahr | 29/519 |
| 2,606,266 | 8/1952 | Doch et al. | 140/123 |
| 3,556,168 | 1/1971 | Baker et al. | 140/113 |
| 3,768,525 | 10/1973 | Kirby | 140/147 |

Primary Examiner—Frederick R. Schmidt
Assistant Examiner—Robert Showalter

[57] ABSTRACT

A splicing tool system for high voltage transmission lines in which a pair of semi-circular jaw members with an internal configuration to match the lay of the wires of the transmission line is frictionally applied to the end of a cut transmission line and moved longitudinally of the line to replace any misplaced wires to a proper lay configuration on the transmission line. The tool is adapted to be operated by a longitudinal motion of remote control source and rotate about the axis of a transmission line.

6 Claims, 2 Drawing Sheets

SPLICING TOOL FOR TRANSMISSION LINES

FIELD OF THE INVENTION

This invention relates to splicing tools for power transmission lines, and more particularly, to a splice accessory tool for use in high voltage transmission line splicing operations.

BACKGROUND OF THE INVENTION

Electrical power companies employ high voltage transmission lines for the transmission of electrical power. Quite often it is necessary to cut a high voltage transmission line for the purpose of disconnecting power or for other reasons. The transmission lines consist of concentric layers of spirally wound bare (or uninsulated) conductor wires about a central bare conductor wire. The adjacent layers of conductor wires are spirally wound in opposite directions to provide a tightly wound compact bundle of wires for the transmission of electrical power.

When it is desired to cut a high voltage transmission line which is conducting electrical power, the technician or operator utilizes special electrically insulated fiberglass tools to maintain an electrically insulated distance between the operator and the transmission line. A nonconductive clamp is attached to a transmission line to either side of a location where a cut in the transmission line will be made and a fiberglass tension rod or "hot stick" is connected to the clamps and fastened in place so that when the transmission line is cut, the loose ends of the transmission line are maintained in a relative position for subsequent reconnection. While the transmission line is held by the clamps and the hot stick, the loose ends of the transmission line between the clamps can be manipulated as necessary. Subsequently, when the loose ends of the transmission line between the clamps are repositioned with the ends in line, a splice can be made across the cut ends. The splice is made by use of a tubular, electrically conductive connector member which slidably receives the cut ends of the transmission line and is crimped on the ends of the transmission line with considerable pressure so as to provide a solid interconnection or electrical bridge across the cut ends of the transmission line.

In the foregoing operation, it can be appreciated that the operator must work from a remote distance using elongated electrically insulated rods or other types of tools to manipulate the cut transmission line and to manipulate the tools used on the transmission line. When the transmission line is cut and moved, it is common for the outer layer of wires on the transmission line to "bird cage", that is, the wires become displaced from their normal lay in the outer layer of wires. Heretofore, it has been necessary for the operator to rearrange the outer layer of wires in the proper lay position prior to making a splice using a pole with a finger attachment. This is both time consuming and tedious. Further, should the operator fail to make the proper realignment of the wires then subsequent connection of the splice connector member can cause the spliced line ultimately to fail with subsequent power disruptions.

The present invention provides an accessory splicing tool for use on a high voltage transmission line to facilitate the alignment of wires on the transmission line to a proper lay on the transmission line prior to making a splice.

DESCRIPTION OF THE PRESENT DRAWINGS

Figure 3:
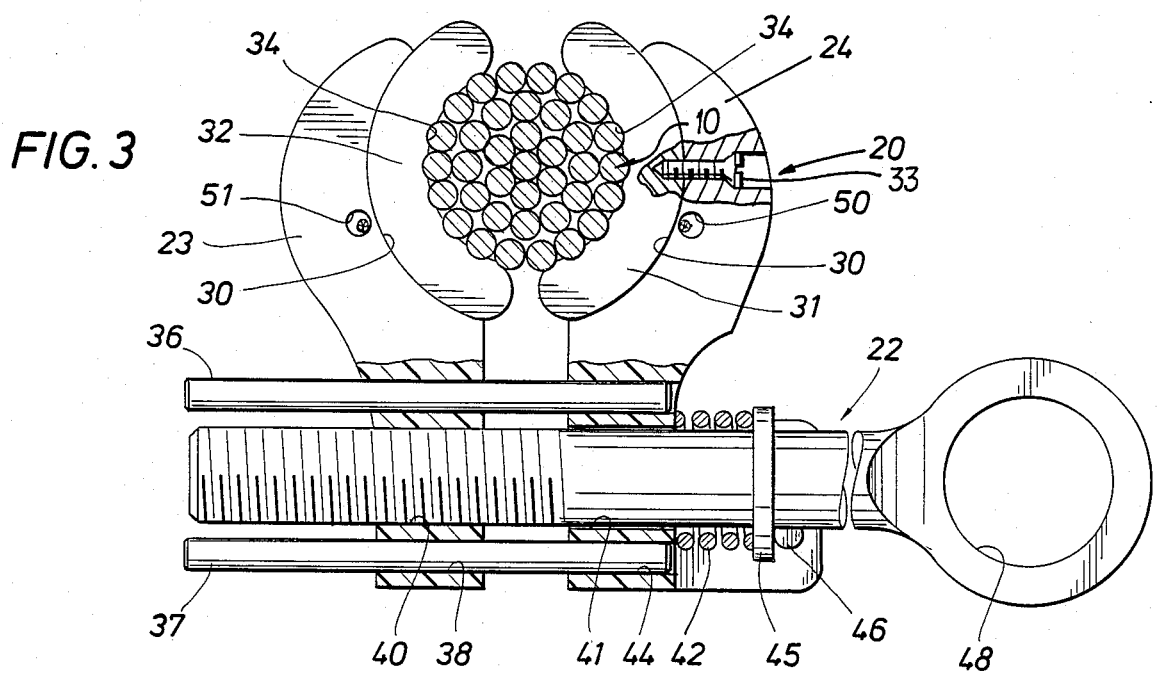
Figure 4:
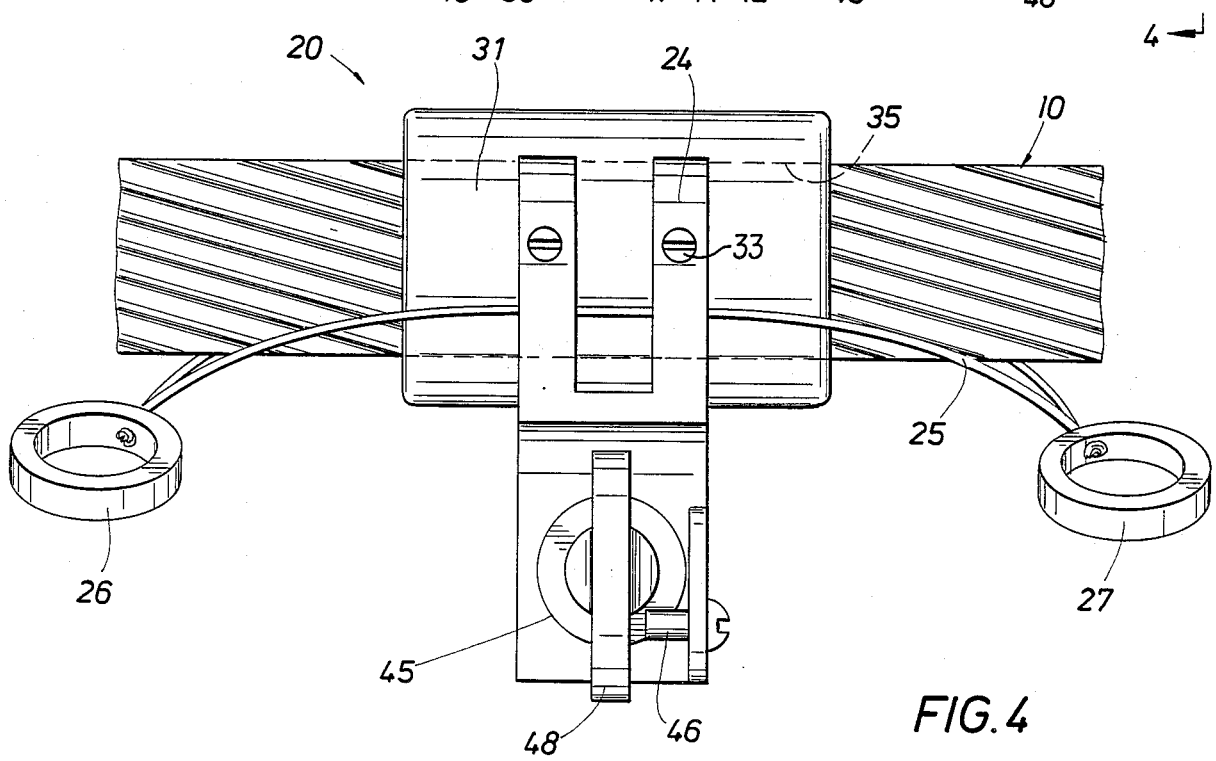
Figure 2:
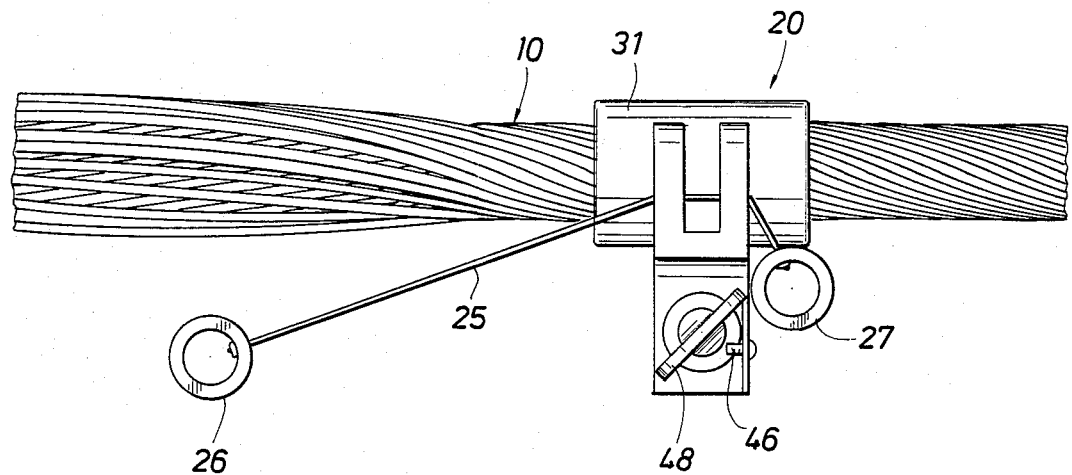
Figure 5:
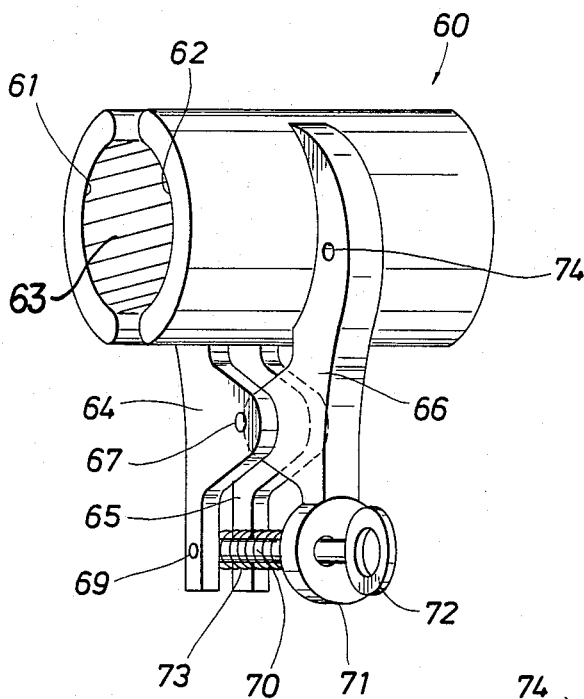
Figure 6:
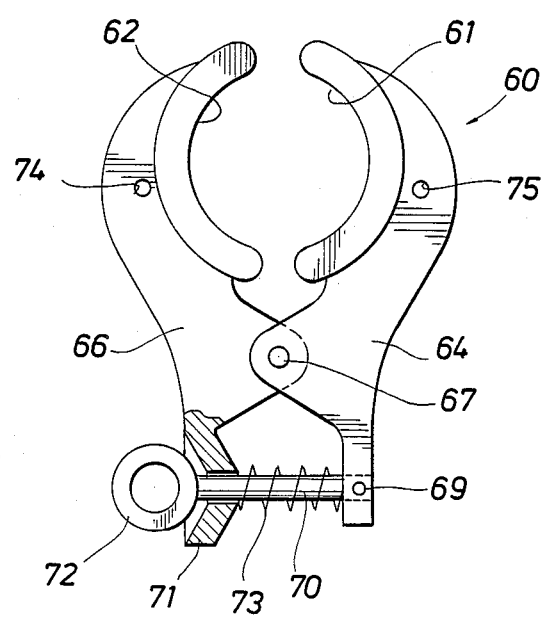

The present invention will be best understood when taken in connection with the claims in the description to follow and the drawings in which, FIG. 1 illustrates schematically a transmission line splicing connection, FIG. 2 illustrates a cut transmission line with a "bird cage" effect and a tool in position on the transmission line for realignment of the conductor wires, FIG. 3 illustrates an end view of the accessory tool of the present invention disposed on a transmission line, FIG. 4 illustrates a side view of the conductor accessory tool shown in FIG. 3, FIG. 5 illustrates another form of the present invention, and FIG. 6 illustrates another view of FIG. 5.

DESCRIPTION OF THE PRESENT INVENTION

Referring now to FIG. 1, a high voltage electrical transmission line 10 is illustrated with a pair of spaced apart clamp members 11, 12 which are interconnected to a rigid fiberglass rod 13 so that when a cut 14 is made in the line 10, the ends of the line between the clamp members 11, 12 can be maintained in a relative position to one another. Ordinarily when a cu 14 is made in the line, one cut end of the line is moved out of the way of the other cut end by bending the loose end a sufficient amount so that the power is disconnected until a splice is made. When it is desired to reconnect the cut ends, the cut ends are positioned with the ends facing one another and a tubular conductor connector member 15 (which has been positioned over one end of the line) is moved to a position as shown in FIG. 1 where both cut ends of the line are in alignment and the conductor member 15 is crimped or passed onto the cut ends of the line so that there is a solid interconnection of the two cut ends of the line which permits the continued transmission of electrical power. In all of these operations, the operator utilizes elongated electrically insulated equipment tools for handling the line and other tools. One such tool is a hollow pole with a center rod which can be moved relative to the pole to produce a push or pull motion.

As shown in FIG. 2, prior to the reconnection and splicing of a transmission line, one or both ends of the line can have wires which become displaced or out of alignment in the outer layer of wire of the transmission line. Heretofore, it has been necessary to utilize a pole extension as a tool to attempt to relocate each of the wires individually in a proper lay position in the transmission line. In FIG. 2, the present invention involves an accessory splicing tool 20 which attaches to or frictionally engages the outer surface wires of the transmission line 10 but is slidable on the wires of the transmission line. The tool 20 has internal spiral grooves which match or receive the curvature of respective wires in the spiral lay of the outer conductor wires of the transmission line so that the tool rotates about the circumference of the transmission line as it moves longitudinally of the line. The accessory tool 20 is provided with a threaded member 22 so that the two separate jaws 23, 24 of the splicing accessory tool 20 may be separated from one another to pass the open jaws over the transmission line. Then, the jaws are brought into a clamping and sliding condition on an undisturbed part of the transmission line where the spiral grooves within the jaws of the tool bear bear upon and align with the outer layer of wires on the transmission line. On either side of the accessory tool 20, each jaw has an opening through which a flexible cord member 25 extends. The cord member 25 extends on each side of the tool 20 to a loop or hook ring 26 and 27. Thus, once the tool 20 is clamped to an outer undisturbed surface of the transmission line, the operator's extension tool or pole can be connected to a ring and by pulling in a direction toward the "bird cage" of the transmission line, the tool 20 will rotate by virtue of the helical grooves matching the helical grooves in the transmission line and cause the misaligned wires to come into alignment on the outer surface of the transmission line by virtue of the mechanical action of the tool.

Referring now to FIG. 3, the alignment tool 20 includes a pair of spaced apart jaw members 23, 24 each of which have a semi-cylindrical shaped support wall with an inner surface 30 to extend along the surface of a transmission line and respectively receive a semi-cylindrical insert 31, 32 which interfits with the wires on a transmission line. Each of the inserts 31 and 32 is removably attached by screws 33 or the like to the jaw or arm members 23, 24 and each insert is arranged to conform to the semi-cylindrical inner surface 30 in a jaw. The inner surface 34 of ach insert has spiral grooves 35 and a diameter which corresponds to the diameter and helical or spiral twist of the wires on the transmission line. The removable inserts permit the use of different sized inserts for different sized transmission line.

One of the jaws 23 at a location below has upper and lower cylindrically shaped alignment pins 36, 37 which extend perpendicular to the axis of a transmission line and the center axis for the inserts.

The alignment pins 36, 37 extend slidably through guide openings 38 in the other facing jaw so that both jaws are interconnected to one another and maintained in positional alignment with respect to one another and to a transmission line. The one jaw 24 is also provided with a threaded member 22 which passes freely through an opening 41 in the one jaw 24 and is threadedly received in a threaded opening 40 in the other jaw 23. A spring member 42 between the theaded member 22 and a base 44 of the one jaw member 23 provides for appropriate tension to spring bias the jaws toward a closed position. By rotation of the threaded member 22, the jaw members are moved toward and away from one another.

As shown in FIGS. 3 and 4 the threaded member 22 has a flange 45 which engages a stop member 46 on the one jaw 23 and is spring biased against the stop member 46. The end of the threaded member 22 has an opening 48 in it which is adapted to receive the operator's tool for rotation of the threaded member 22 and for moving the jaw members toward and away from one another.

The jaw members 23, 24 have transverse openings 50, 51 just below a horizontal plane through the center axis of the jaw members. The openings slidably receive a flexible cord 25. On either side of the jaw members, the cord 25 is attached to circular rings 26, 27. The length of the cord 25 is made sufficient so that the tool is permitted to rotate and twist the cord 25 as the tool rotates around the transmission line when the tool is moved longitudinally.

In operation, the operator affixes the clamps 11, 12 and tension bar 13 to the transmission line 10 to be cut and makes the cut. The ends of the transmission line are manipulated as necessary. If either cut end of the transmission line requires conductor wire alignment, the operator attaches the tool 20 to an extension pole by the opening 48 and opens the jaw members to receive a transmission line. The open jaws are then passed over a transmission line at a location where the wires of that transmission line are undistrubed. Next, the threaded member 22 is rotated by the operator pole until the jaw members 23, 24 are in sliding engagement with the transmission line and the spiral grooves 35 receive the conductor wires in the outer layer of wires on the transmission line. The pole tool is then disconnected from the tool 20 and attached to a ring 26 or 27 and pulled in the direction of the misaligned wires. The tool 20 rotates about the axis of the transmission line and the length of the cord 25 permits the cord to twist until the tool reaches the cut end of the transmission line. After the wires are realigned, the conductor splice sleeve 15 is adjusted over the cut ends of the transmission line and clamped to the transmission line to complete the splice.

Referring now to FIGS. 5 and 6, another form of the splicing accessory tool is illustrated. The tool 60 includes semi-cylindrically shaped walls 61 and 62 with internal spiral grooves 63. The walls 61, 62 and grooves 63 are arranged to conform to the outer surface of a transmission line. The walls 61, 62 are attached to longitudinally spaced apart arm or jaw members 64 and 65, the arm members extending from the curvature of the wall 61 to a pivot point 67 and thence to a location on the same side of a center axis as the wall 61. The wall 62 is attached to an arm member 66 located longitudinally midway of the longitudinal spacing between arm members 64, 65, the arm member 66 extending from the curvature of the wall 62 to the pivot point 67 and then to a location on the same side of a center axis as the wall 62. A pivot pin at the pivot point 67 interconnects the arm members 64-66. The extended ends 68, 69 of the arm members 64, 65 are connected by a pin 69 to a push-pull rod 70. The push-pull rod 70 extends through a flanged opening in the extended end 71 of the arm member 66 and has a ring type connector 72. A spring member 73 is in compression to resiliently bias the extended ends of the arm members away from one another which moves the walls 61, 62 toward one another. To operate the tool 60, the operator attaches a push-pull rod tool to the ring 72 and to the flange 71 about the rod opening to pull the extended ends of the arm members toward one another, thereby further compressing the spring 70 and opening the walls 61, 62 to receive a transmission line. Upon release of the push-pull rod, the spring force on the ends of the arm members causes the walls 61, 62 to move toward one another and to frictionally engage a transmission line. Openings 74, 75 are provided in each of the jaw members 64-66 to receive a flexible cord member. The tool 60 operates in the same manner as described with respect to FIGS. 1-4. The openings 74, 75 are located on a horizontal plane slightly below a horizontal plane through the center axis for the walls 61, 62.

The foregoing disclosure and description of the invention are illustrative and explanatory thereof, and various changes in the size, shape and materials, as well as in the details of the illustrated construction may be made without departing from the spirit of the invention.

I claim:

1. A splicing accessory tool for use in splicing high voltage electrical transmission lines comprising:
   at least two facing jaw means having facing, semicylindrically curved contact surfaces for slidably engaging at least 50% of the circumference of a transmission line along a section of transmission line having spirally wound conductor wires, said contact surfaces having spiral grooves to conform to the curvature of individual wires in a transmission line;

means for interconnecting said jaw means to one another for movement of said jaw means between a closed engagement condition with the outer surface of a transmission line and an open condition where the jaw means can be removed from or placed upon a transmission line;

a single actuator means for controlling movement of said jaw means between said open and closed conditions; and pulling means connected to said jaw means for applying a pulling force to move the jaw means in a longitudinal direction along a stationary transmission line, said pulling means permitting rotation of the jaw means around a transmission line when the jaw means are moved longitudinally of a transmission line by the pulling means, said pulling means including a flexible cord member coupled to each of said jaw means and having sufficient length to at least one side of said jaw means to permit twisting of said cord member when the tool is rotated about a axis of rotation.

2. The accessory tool as defined in claim 1 wherein said flexible cord member is slidably coupled to said jaw means and has sufficient length to either side of said jaw means to permit twisting of said cord member when the tool is rotated about an axis of rotation.

3. A method of slicing high voltage electrical power lines having spirally wound outer conductors comprising the steps of:

aligning the ends of a cut transmission line to be spliced;

with a remotely operated extension pole, attaching a tool for applying a radially directed inward force to at least 50% of the outer wires of a spirally wound transmission line at a location where the outer wires are in proper alignment;

with a remotely operated extension pole, moving the tool for applying a guiding force to each of the wires receiving the radially directed inward force with a spiral longitudinal motion over the length of a transmission line between the location where the inward force is applied and the cut end of a transmission line for aligning the outer wires of a transmission line to a proper alignment;

with a remotely operated extension pole, removing the tool and splicing the cut ends to one another.

4. The method as set forth in claim 3 wherein the guiding force is applied with a spirally grooved contact surface which frictionally engages the outer surface of a transmission line.

5. A splicing accessory tool for use in splicing high voltage electrical transmission lines comprising:

at lease two facing jaw means having facing, semicylindrically curved contact surfaces for slidably engaging at least 50% of the circumference of a transmission line along a section of transmission line having spirally wound conductor wires, said contact surfaces having spiral grooves to conform to the curvature of individual wires in a transmission line;

means for interconnecting said jaw means to one another for movement of said jaw means between a closed engagement condition with the outer surface of a transmission line and an open condition where the jaw means can be removed from or placed upon a transmission line;

a single actuator means for controlling movement of said jaw means between said open and closed conditions;

said actuator means for controlling movement of said jaw means includes arm members and a threaded member interconnecting said arm members for moving said arm members relative to one another; and said means for interconnecting said jaw means to one another including alignment pins extending between said arm members for maintaining positional alignment of said arm members to one another; and pulling means connected to said jaw means for applying a pulling force to move the jaw means in a longitudinal direction along a stationary tranmission line, said pulling means permitting rotation of the jaw means around a transmission line when the jaw means are moved longitudinally of a transmission line by the pulling means.

6. The accessory tool as defined in claim 5 wherein said single actuator means for controlling movement of said jaw means includes arm members and resilient means extending between ends of the arm members for moving one of said arm members away from the other of said arm members, and said means for interconnecting said jaw means to one another includes pivot means interconnecting said arm members so that the other end of said arm members can move toward and away from one another.

* * * * *